United States Patent [19]

Brooks et al.

[11] Patent Number: 5,263,382
[45] Date of Patent: Nov. 23, 1993

[54] SIX DEGREE OF FREEDOM MOTION DEVICE

[75] Inventors: Thurston L. Brooks, Bel Air; Kevin R. Cleary, Bethesda, both of Md.; Mark Uebel, Washington, D.C.

[73] Assignee: Hughes Aircraft Company, Los Angeles, Calif.

[21] Appl. No.: 870,121

[22] Filed: Apr. 13, 1992

[51] Int. Cl.$^5$ .............................. G05G 9/00; B25J 11/00
[52] U.S. Cl. .......................... 74/471 XY; 74/479 BW; 901/26; 901/23
[58] Field of Search ............... 74/471 XY, 479, 665 C, 74/417; 414/680, 724, 735; 901/23, 26, 28, 29

[56] References Cited

U.S. PATENT DOCUMENTS

| | | | |
|---|---|---|---|
| 4,666,362 | 5/1987 | Landsberger | 414/735 |
| 4,806,068 | 2/1989 | Kohli et al. | 74/479 B X |
| 4,819,496 | 4/1989 | Shelef et al. | 901/23 X |
| 4,919,382 | 4/1990 | Forman | 74/479 BW X |
| 4,976,582 | 12/1990 | Clavel | 414/729 |
| 4,988,244 | 1/1991 | Sheldon et al. | 901/23 X |
| 5,053,687 | 10/1991 | Merlet | 901/29 X |

OTHER PUBLICATIONS

HEXA: a fast six-DOF fully-parallel robot by F. Pierrot, P. Dauchz and A. Fournier, pp. 1158-1163, IEEE, 1991.
A Platform With Six Degrees of Freedom by D. Stewart vol. 180 Pt 1 No. 15, Proc Instn Mech Engrs 1965-66.
A Parallel Robot-Arm Regional Structure With Actuational Redundancy by Theodore Kokkinis and Pierre Millies pp. 629-641, 1991.
RSI Hand Controller and brochure cover page photographs, Nov. 21, 1991.

Primary Examiner—Leslie A. Braun
Assistant Examiner—David W. Laub
Attorney, Agent, or Firm—Gordon R. Lindeen, III; Wanda K. Denson-Low

[57] ABSTRACT

A motion device with three legs provides six degrees of freedom using a pair of motor assemblies (22) to drive each leg. Each leg has a differential drive (28, 30, 32, 40) for providing a pitch-roll joint connected to an elbow (16) for providing a pitch joint connected to a second roll joint (56) connected to a universal joint (62, 72). An actuated plate (10) is connected to the universal joint. All of the motors drive the differential drive from the base of the unit and do not add inertia to the actuated plate. The same kinematic arrangement can be used for hand controllers as well as for end effectors and other movable platforms.

36 Claims, 4 Drawing Sheets

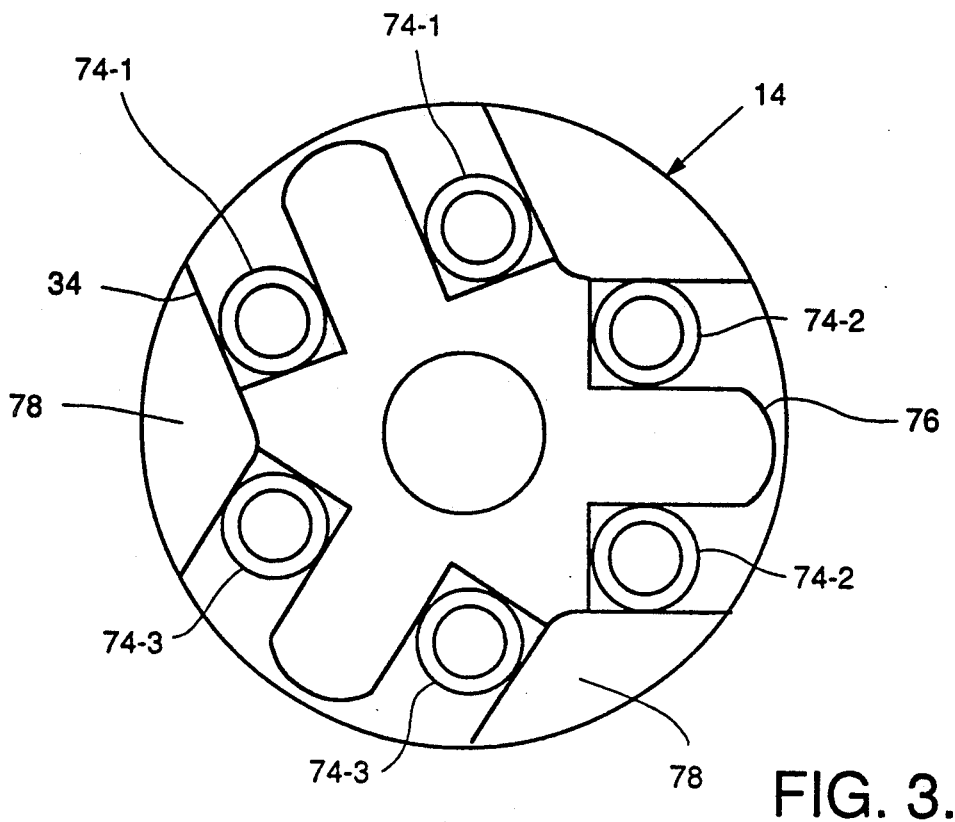
FIG. 3.
FIG. 5.
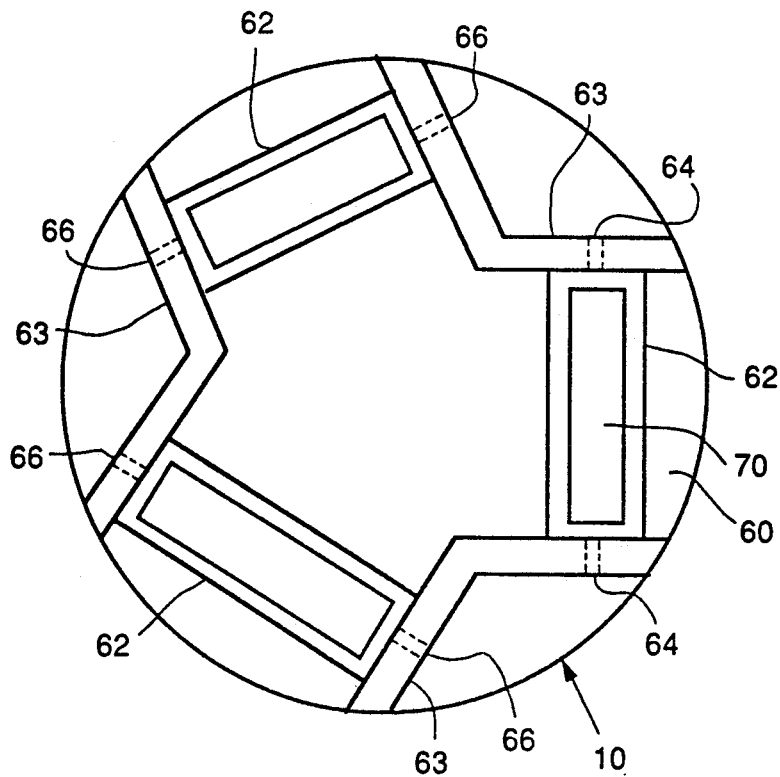

1

SIX DEGREE OF FREEDOM MOTION DEVICE

FIELD OF THE INVENTION

The present invention pertains to the field of parallel link motion devices and in particular to a mechanism for transmitting movement in six degrees of freedom suitable for use, for example, in robotic end effectors and hand controllers among other things.

BACKGROUND OF THE INVENTION

Parallel link mechanisms have been used extensively for flight simulators, for hand controllers and for a variety of robotic end effectors. These parallel link mechanisms typically require six legs to achieve six independent degrees of freedom. Most of these mechanisms also use prismatic connecting legs. A large number of prismatic legs significantly limit the range of motion of the moving platform and increase the weight and expense of the entire mechanism. Parallel link mechanisms often require that large actuators be mounted on the moving legs of the mechanisms. This increases the inertia of the moving platform which limits its speed and precision.

SUMMARY OF THE INVENTION

The present invention, by providing revolute legs in a unique kinematic arrangement and by distributing loads between three different legs provides a compact high load capacity and high speed motion device unique in the art. In one embodiment, the invention encompasses an apparatus for transmitting movement in six degrees of freedom between a base plate and a top plate with a plurality of legs. Each leg has a lower link coupled to the bottom plate and an upper link coupled to the top plate. The lower and the upper link are connected together by an elbow with one degree of freedom. A differential drive for each leg couples each leg's lower link to the bottom plate and a universal joint couples each leg's upper link to the top plate. The upper link also has a second roll joint for rotating about its axis of elongation. The differential drive preferably has a link gear at the end of the lower link of each leg for rotating the lower link about its axis of elongation and a pair of drive gears on opposite sides of the link for rotating the link gear.

BRIEF DESCRIPTION OF THE DRAWINGS

These and other aspects of the invention will be more fully understood by referring to the following detailed description and the accompanying drawings wherein:

FIG. 3 is a top view of the base plate of FIG. 2 with the differential drive mechanism and motors removed;

FIG. 5 is a bottom view of the top plate of the motion device of FIG. 2 with the upper links and universal joints removed.

DETAILED DESCRIPTION OF THE INVENTION

Figure 1:
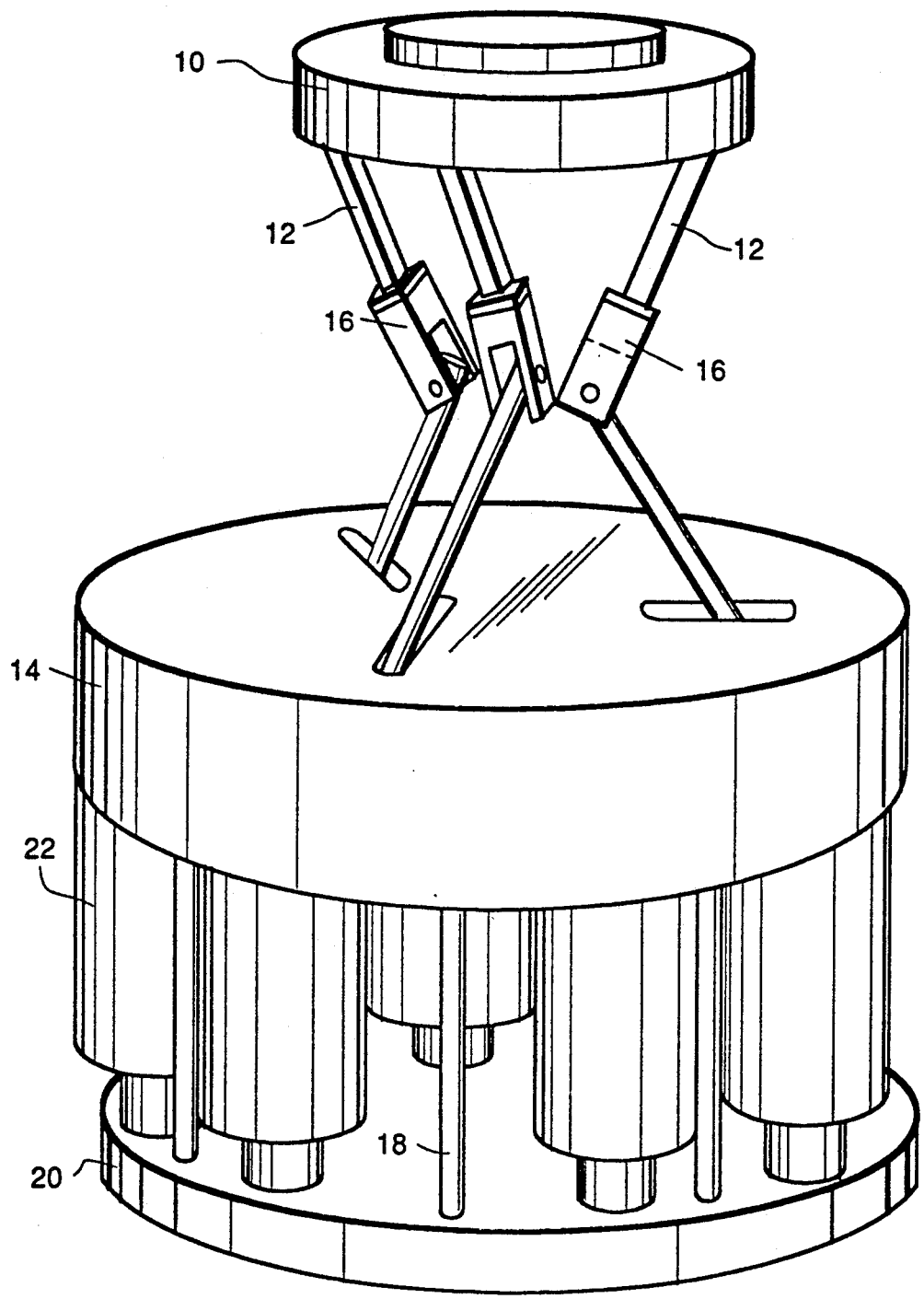
FIG. 1 is a perspective view of a motion device constructed according to the present invention.

FIG. 1 shows the present invention in an embodiment suitable for use as a robotic end effector for manufacturing or for use as an adaptive fixturing device or for similar applications. The end effector has a top plate 10 upon which a work piece or tool is typically mounted. A set of three legs 12 extend from three evenly spaced positions about the bottom of the top plate to a bottom plate 14. While the preferred embodiment is shown and described in terms of top and bottom for convenience, the invention can be operated in any orientation. The bottom plate supports each of the legs which in turn support the top plate. Each leg has an elbow 16 preferably approximately half way between the top plate and the bottom plate. As will be described in more detail below, each elbow can bend either toward or away from the elbows of the other legs. The bottom plate is supported by a set of six support pillars 18 to a base plate 20. The base plate is typically mounted to some sort of movable apparatus to which the end effector is connected. Three pairs of motor assemblies 22 are fastened to the bottom plate and extend downward from the bottom plate. Each motor assembly preferably includes an electromagnetic servo motor, a harmonic drive gear reduction unit which couples the motor to a differential drive mechanism and an encoder which detects the position of the motor rotor. The position information is transmitted to an electronic controller (not shown) for controlling the position and movement of the motors and thereby the top plate of the end effector.

Figure 2:
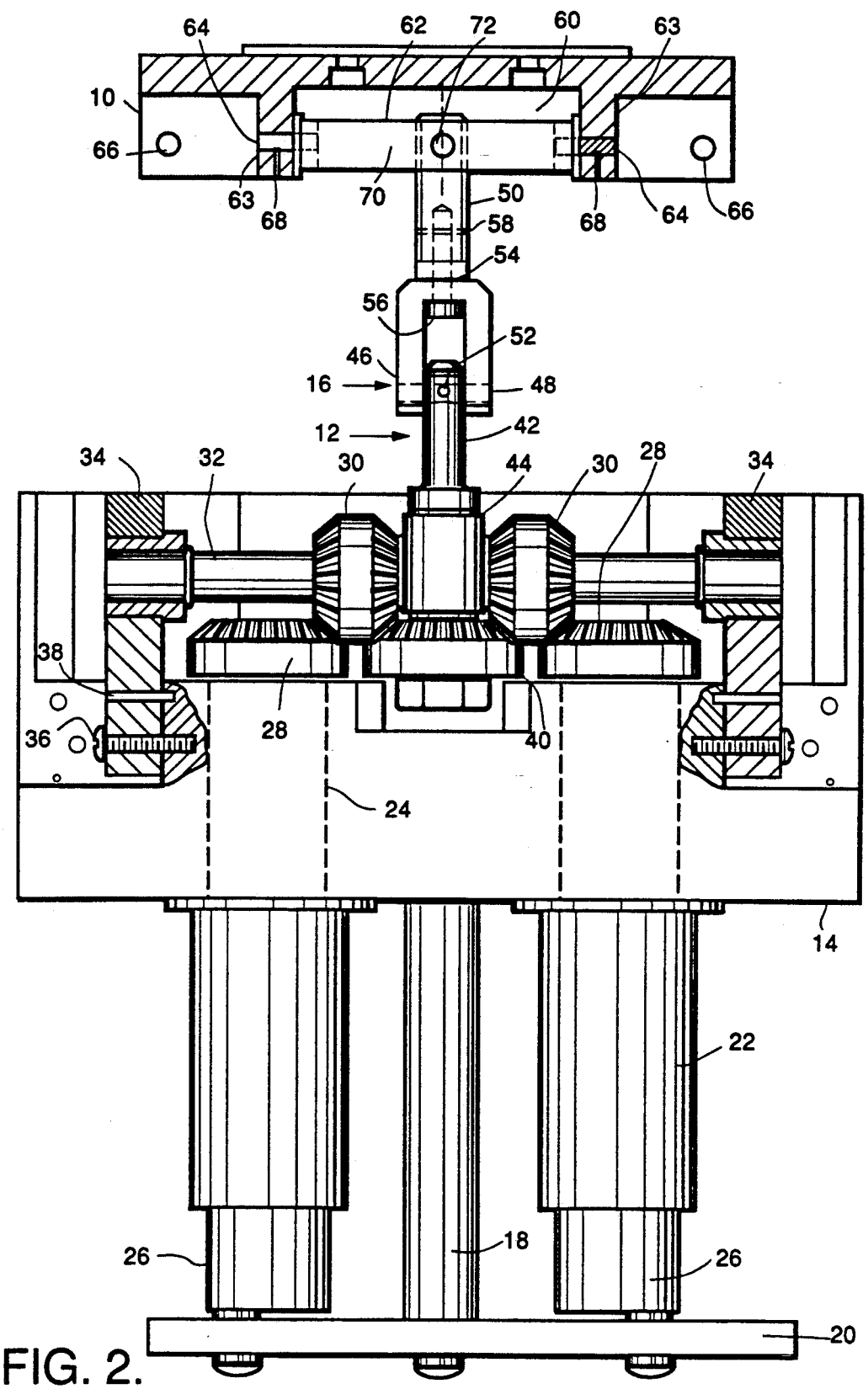
FIG. 2 is a side view in partial cross section of the motion device of FIG. 1 showing only one leg and one pair of motors.

Referring to FIG. 2, each motor rotor connects to a conventional harmonic drive gear reduction unit 24 which connects to a beveled drive gear 28. The positions of the two drive gears for each leg determine the position of the leg of the end effector. Accordingly, the encoders 26 at the base of the motor assemblies, by reading the position of the rotor, can determine precisely the position of the top plate 10. Each bevel drive gear is coupled to a double bevel transfer gear 30. It is preferred that, as shown in FIG. 2, the drive gears rotate about a vertical axis to drive the transfer gears which rotate about a horizontal axis. Throughout the application elements will be referred to as being horizontal or vertical. These references refer to the relative orientations as shown in the drawings. However, the motion device can be operated in any desired orientation. The transfer gear axis of rotation is supplied by a horizontal axle 32 which is mounted at both ends to rigid side walls 34 which are in turn connected by screws 36 and pins 38 into the bottom plate. The transfer gears, through teeth opposite the teeth that engage the drive gears, drive a link gear 40 which is rigidly fastened to the end of the leg 12. Each leg has a lower link 42 which extends through a bore 44 in the horizontal differential axle to the link gear 40. Opposite the link gear, the lower link of the leg couples to a clevis 46. The clevis is U-shaped with the open side of the U being constructed to match the outer width of the lower link of the leg. A horizontal bore drilled through each side of the U and through the lower link of the leg receives a pin 48 and establishes an axis of rotation to form the elbow 16 between the lower link and an upper link 50 which forms the opposite top end of the leg 12. The clevis rotates about the elbow pin 48 which is held in place by a drill pin 52 which extends perpendicularly through the lower link and the elbow pin. Opposite the elbow pin at the closed end of the U, the clevis has a central vertical bore 54 which runs through the base of the U. The upper link is elongated and fits on top of the closed end of the U and has a central bore parallel to its axis of elongation that coincides with the bore in the bottom of the U of the clevis. A shoulder pin 56 extends from the closed end of the U through the bore in the clevis and the bore in the upper link. The pin has a head which fits against the surface of the closed end of the U to hold it against the U. A drill pin 58 through the upper link and the shoulder pin retains the shoulder pin in place. The shoulder pin allows the clevis to rotate about the axis of the shoulder pin perpendicular to the axis of the elbow pin. The upper link extends from the clevis away from the base plate and is attached to the top plate 10 with a two degree freedom joint.

The two degree of freedom universal joint in the top plate for each leg is set into a recess 60 in the top plate. There is one recess for each universal joint as shown in FIG. 5. A horizontal universal shaft 62 is held into the recess with a pivot pin 64 at either end of a vertical wall 63 in the recess 60. These pins allow the horizontal shaft to rotate about a horizontal axis. One of each of the other two pairs of pins 66 that hold the horizontal universal shafts for the other two legs are also visible in FIG. 2. As with the other pins, drill pins 68 are used to hold the pins in place. The drill pins extend perpendicular to the axis of the pivot pins. The horizontal shaft has an elongated slot 70 (shown in hidden lines in FIG. 2) into which the upper end of the upper link extends. The upper link is then held into the horizontal universal shaft with a universal joint pin 72 which extends through the horizontal universal joint shaft and the upper end of the upper link perpendicular to the other pins 64. Accordingly, the upper link can rotate about this shaft in one horizontal direction and about the two pivot pins 64 in another perpendicular horizontal direction.

As can be seen in FIG. 2, each leg of the motion device has a pair of motors which drive gears which, through double bevel transfer gears, operate a link gear at the base of a lower link of each leg. This leg rotates about a vertical axis and about a horizontal axis i.e. about a pitch axis and a roll axis. In response to the drive input from the motors, the lower link of the leg is coupled to an upper link by an elbow formed by the clevis and the clevis pin. This elbow preferably rotates about a pitch axis. This axis is perpendicular to the roll axis of the differential drive. By pitch, rotation about an axis tangential to a base circle is meant. The base circle is a circle with a center at the center of the bottom plate and a radius equal to the distance from the bottom plate to the axis of the pitch joint. By roll, rotation about a member's axis of elongation is meant. The upper link connects to the clevis with a joint that rotates about a vertical axis, a roll joint, and the end of the upper link has a universal joint connection to the top link which rotates about two perpendicular horizontal axes. Accordingly, beginning at the base plate, there is a pitch-roll two degrees of freedom joint through the differential drive, a pitch joint at the elbow, and a three degrees of freedom joint connection to the top plate. Each of the three axes of the top plate connection joint are perpendicular to each other. It is preferred that the gears, links and pins all be fabricated from a high strength stainless steel and that all moving parts be lubricated as is known in the art. The clevis 46 and universal shaft 62, however are preferably made from aluminum to minimize friction against the shoulder pin and the upper link.

The construction of the bottom plate is shown from the top with the motors removed in FIG. 3. The bottom plate is preferably round with pairs of motor mounts 74 evenly spaced around the plate. There is a pair 74-1, 74-2, 74-3 of motor mounts for each of the three legs. In between each motor mount pair is a recess 76 which provides clearance for the bottom of the lower link. A second set of recesses in between each pair of motor mounts 78 provides a mounting surface for the walls 34 which support the differential drive mechanism. The bottom plate shown in FIG. 1 includes cover plates not shown in FIGS. 2 and 3.

Figure 4:
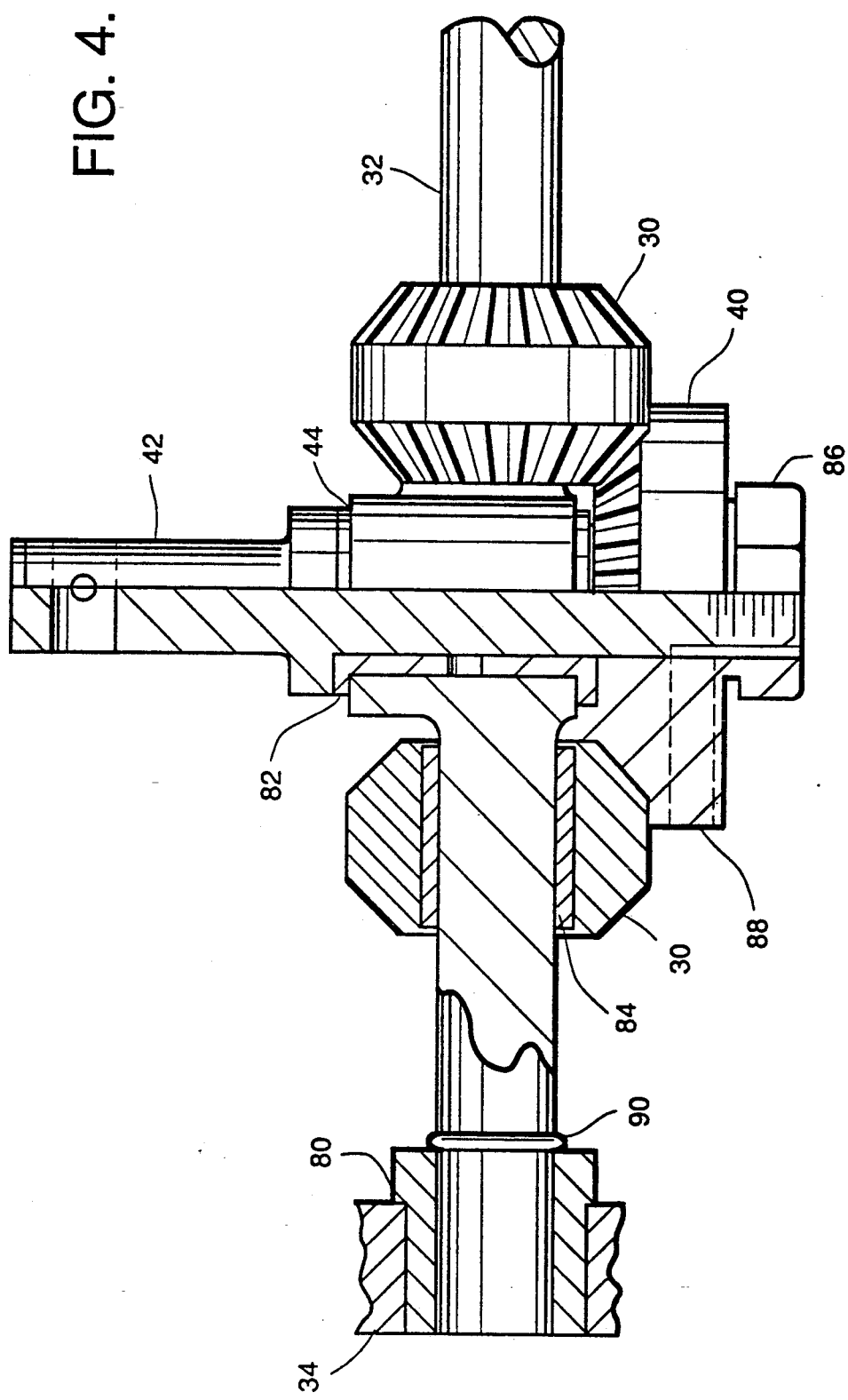
FIG. 4 is a side view in partial cross section of a portion of the differential drive of FIG. 2.

As shown in FIG. 4, the walls 34 which are fastened to the recesses beside each pair of motor mounts supports the horizontal axes or differential centers 32. The differential centers are mounted to the side walls 34 preferably in bronze bearings 80 although ball bearings may also be used. The bronze bearings receive opposite ends of the differential center 32 and rotatably support this center in the walls. The differential center is an elongated shaft that extends from one side wall to the other and has a central bore 44. The lower link is supported in this bore so that it rotates with respect to the bore in a second set of bronze bearings 82. The bronze bearings at either end of the differential center and in the central bore of the differential center allow the lower link 42 to have both roll and pitch degrees of freedom. The double bevel transfer gears 30 are placed around the ends of the differential center 32 and allowed to rotate with respect to the differential center by another set of bronze bearings 84 in the central bores of the transfer gears.

The differential drive is assembled by first inserting the lower link 42 into the bronze bearings 82 in the bore 44 of the differential center. The lower link gear 40 is then inserted over the outside end of the lower link and held in place by a hex nut 86 at the extreme lower end of the lower link. A set screw 88 prevents the hex nut from rotating thereby preventing the lower link gear from becoming unscrewed from the end of the lower link. The transfer gears 30 then each slide over one end of the differential center on their own bronze bearings to a position where they engage the teeth of the lower link gear. Then a snap ring 90 is snapped into grooves at either end of the differential center. The bronze bearings for the ends of the differential center 80 are inserted into the mounting holes in the side walls 34 and the ends of the differential center are inserted into the side wall bearings 80. The whole assembly, with side walls, differential center and lower link is then lowered into place in the bottom plate and the rigid side walls are screwed into the bottom plate using screws 36. The drive gears 28 at the ends of the motor assemblies engage the double bevel transfer gears as the differential drive is lowered into place on the bottom plate. The transfer gears are held in place by the lower link gear on one side and the drive gears on the other side so that the beveled rows of teeth on the two sides of each double beveled gear engage the drive gear and each lower link gear respectively.

The hex nut 86 butts against the link gear and determines the vertical position of the link gear on the lower link. After the differential drive is assembled on the bottom plate and before the set screw 88 is tightened, the hex nut can be tightened against the link gear in order to eliminate any backlash or free play in the drive mechanism. Tightening the hex nut pushes the link gear against the transfer gears which slide outwardly against the drive gears until any undesired backlash or free play is eliminated. The set screw is then tightened to secure the hex nut in place. After the adjustment, the hex nut prevents the link gear from moving downward and the transfer gears prevent the link gear from moving upward.

The top plate is shown in greater detail in FIG. 5 with the horizontal universal joint shafts 62 installed using the pivot pins 64 as shown in FIG. 5. The top plate has recesses evenly spaced around the circular top plate so that the three legs attach at points evenly spaced around the circular top plate. The horizontal universal joint shafts fit into a recess 60 and the pivot pins are installed through recesses on either side of the central recess 60.

In the robotic end effector embodiment shown in the drawings, the position of the top plate can be very precisely controlled by actuating the motors 22. Each motor drives a separate drive gear which, in conjunction with the other motor of the motor pair for each leg, precisely controls the movement of each leg. The encoders determine the position of the rotor shafts of each motor and preferably relay this information to a central controller which determines, by manipulation of the motors, the position of the top plate. Because all of the motors are fastened to the fixed bottom plate and not to the moving top plate, the top plate of end effector has very low inertia and can be moved quickly and easily. In some applications, it may be preferred to provide a force sensor on the top surface of the top plate, also coupled to the controller, to provide information to supply variable active compliance. Because of the light weight and low inertia of the top plate, the present invention is particularly well suited to implementing variable active compliance end effector systems. A variety of different mechanical impedances and damping effects can be produced using techniques known in the art. Unlike other three leg actuators, the top plate of the present invention has a full six degrees of freedom and a very wide range of motion.

While the present invention has been described above in terms of an end effector, the kinematic arrangement is well suited for a variety of different applications. These applications include positioning fixtures in which an object located on the top plate can be precisely positioned by operating the motors and flight simulators in which a simulated cockpit can be placed on the top plate and moved about by the motors. A virtual reality hand controller can be constructed by placing a handle on the top plate using the motors to generate forces and torques to simulate contact with a real object.

A variety of modifications and adaptations can be made to the present invention. The proportions of the upper and lower links with respect to each other can be varied. The arrangement of drive gears to operate the differential drive mechanism can be modified to suit different preferred motor placements, for example, the transfer gears 30 can be replaced by single bevel spider gears and the motors placed so that their shafts are horizontal and operate on the link gear through the horizontal spider gears. While electric motors with harmonic drives are presently preferred, a variety of different power or sensing mechanisms including stepper motors can be employed. The specific mechanical arrangements illustrated in the drawings to achieve the degrees of freedom required by each joint can be modified to suit particular applications and the proximity of each respective degree of freedom joint can be varied with respect to the others. The invention is not to be limited to the particular embodiment described above, but only by the claims below.

What is claimed is:

1. Apparatus transmitting movement in six degrees of freedom between a base plate and a top plate comprising:
   a plurality of legs, each having an elongated lower link coupled to the base, plate and an elongated upper link coupled to the top plate, the lower and the upper link being connected by an elbow having one degree of freedom about an axis perpendicular to the axes of elongation of the upper and lower links;
   a differential drive for each leg for coupling each leg lower link to the base plate; and
   a joint having three intersecting axes of rotation for each leg for coupling each leg upper link to the top plate.

2. Apparatus of claim 1 wherein the elbow comprises a clevis on one of the links and a clevis pin extending through the clevis and the other one of the links so that the clevis pivots about the clevis pin.

3. Apparatus of claim 2 wherein the clevis is on the upper link and the three axes joint comprises a shoulder pin extending through the clevis and the upper link along the axis of elongation of the upper link so that the upper link can rotate with respect to the clevis about the axis of the shoulder pin.

4. Apparatus of claim 1 wherein each differential drive comprises a link gear at the end of the lower link for rotating the lower link about its axis of elongation and a pair of drive gears on opposite sides of the link gear for rotating the link gear.

5. Apparatus of claim 4 wherein the drive gears are operable independently of each other in both the same and opposite directions.

6. Apparatus of claim 4 wherein the drive gears are each driven by an independent motor for manipulating the legs and thereby moving the top plate.

7. Apparatus of claim 6 wherein the motors comprise electromagnetic actuators.

8. Apparatus of claim 4 wherein the link gear comprises a bevel gear.

9. Apparatus of claim 8 wherein the drive gears comprise bevel gears which rotate about an axis normal to the base plate.

10. Apparatus of claim 9 wherein each differential drive comprises a pair of transfer gears for transmitting forces between the drive gears and the link gear, the transfer gears being double bevel gears which rotate about an axis perpendicular to the axis about which the drive gears rotate.

11. Apparatus of claim 10 wherein each differential drive comprises an elongated transfer gear axle extending along the axis of transfer gear rotation for supporting the transfer gears, the axle having a rotational bearing at each end for rotationally supporting the axle and a central bearing sleeve through which the lower link extends for rotationally supporting the lower link, and thereby permitting two degrees of freedom for the lower link at the differential drive.

12. Apparatus of claim 10 wherein each differential drive comprises an elongated transfer gear axle extending along the axis of transfer gear rotation for supporting the transfer gears, the axle having a rotational bearing at each end for rotationally supporting the axle and a central bearing sleeve through which the lower link extends for rotationally supporting the lower link, and thereby permitting two degrees of freedom for the lower link at the differential drive.

13. Apparatus transmitting movement in six degrees of freedom between a base plate and a top plate comprising:
   three legs, each having a lower link coupled to the lease plate and an upper link coupled to the top plate, the lower and the upper link being connected by an elbow having one degree of freedom about an axis perpendicular to the axes of the upper and lower links;
   a lower joint providing two rotational degrees of freedom for each leg for coupling each leg lower link to the base plate; and
   an upper joint having three intersecting axes of rotation providing two degrees of freedom for each leg for coupling each leg upper link to the top plate.

14. Apparatus of claim 13 wherein the lower joint provides pitch and roll with respect to the base plate.

15. Apparatus of claim 13 wherein the lower joint comprises a differential drive 16. Apparatus of claim 13 wherein the elbow comprises a clevis on one of the links and a clevis pin extending through the clevis and the other one of the links so that the clevis pivots about the clevis pin.

17. Apparatus of claim 16 wherein the clevis is on the upper link and the three-axes joint comprises a shoulder pin extending through the clevis and the upper link along the axis of elongation of the upper link so that the upper link can rotate with respect to the clevis about the axis of the shoulder pin.

18. Apparatus of claim 13 wherein each differential drive comprises a link gear at the end of the lower link for rotating the lower link about its axis of elongation and a pair of drive gears on opposite sides of the link gear for rotating the link gear.

19. Apparatus of claim 18 wherein the drive gears are operable independently of each other in both the same and opposite directions.

20. Apparatus of claim 19 wherein the drive gears are each driven by an independent motor for manipulating the legs and thereby moving the top plate.

21. Apparatus of claim 20 wherein the motors comprise electromagnetic actuators.

22. Apparatus of claim 18 wherein the link gear comprises a bevel gear.

23. Apparatus of claim 22 wherein the drive gears comprise bevel gears which rotate about an axis normal to the base plate.

24. Apparatus of claim 23 wherein each differential drive comprises a pair of transfer gears for transmitting forces between the drive gears and the link gear, the transfer gears being double bevel gears which rotate about an axis perpendicular to the axis about which the drive gears rotate.

25. In an end effector having a base plate and a plurality of legs extending from the base plate operating a top plate, a differential drive for transmitting movement in at least two degrees of freedom between the base plate and a leg comprising:
   a bevel link gear at the end of the leg;
   a pair of bevel drive gears on opposite sides of the link gear rotatable about an axis normal to the base plate independently of each other in both the same and opposite directions; and
   a pair of transfer gears between and coupled to the drive gears and the link gear for transmitting movement between the drive gears and the link gear, the transfer gears being double bevel gears rotatable about an axis perpendicular to the axis about which the drive gears rotate.

26. Differential drive of claim 25 comprising an elongated transfer gear axle extending along the axis of transfer gear rotation for supporting the transfer gears, the axle having a rotational bearing at each end for rotationally supporting the axle and a central bearing sleeve through which the lower link extends for rotationally supporting the lower link, and thereby permitting two degrees of freedom for the lower link at the differential drive.

27. Differential drive of claim 16 comprising a side wall for supporting the rotational bearings of each transfer gear axle end and thereby supporting the differential drive, the side walls being mounted to the base plate.

28. Differential drive of claim 25 wherein the drive gears are each driven by an independent motor for manipulating the legs and thereby moving the top plate.

29. Differential drive of claim 28 wherein the motors comprise electromagnetic actuators.

30. Differential drive of claim 25 comprising a fastener for limiting the range of motion of the link gear to control the relative position between the link gear and the transfer gears.

31. Differential drive of claim 30 wherein the transfer gears are free to move along their axis of rotation toward and away from the link and drive gears so that the fastener also controls the relative position between the drive gear and the transfer gears.

32. Differential drive of claim 30 wherein the fastener comprises a nut on the end of the leg adjacent the link gear, the nut being rotatable to adjust the limitation of the link gear range of motion.

33. In an end effector having a base plate and a plurality of elongated legs extending from the base plate operating a top plate, a differential drive transmitting movement between the base plate and a leg comprising:
   a bevel link gear at the end of the leg;
   a pair of bevel drive gears on opposite sides of and coupled to the link gear;
   a fastener for limiting the range of motion of the bevel link gear along the leg axis of elongation for ensuring a secure coupling with the drive gears.

34. Differential drive of claim 33 wherein the fastener comprises a nut on the end of the leg adjacent the link gear; the nut being rotatable to adjust the link gear's range of motion with respect to the drive gear for ensuring a secure coupling with the drive gears.

35. Differential drive of claim 34 wherein the end of the leg comprises threads and the nut is rotatable on the threads for movement along the leg's axis of elongation.

36. Differential drive of claim 33 comprising a pair of transfer gears between and coupled to the drive gears and the link gear for transmitting movement between the drive gears and the link gear, the transfer gears being rotatable and translatable about an axis perpendicular to the axis about which the drive gears rotate so that the fastener also adjusts the link gear's range of motion with respect to the transfer gears and the transfer gear's range of translatable motion with respect to the drive gears.

* * * * *

UNITED STATES PATENT AND TRADEMARK OFFICE
CERTIFICATE OF CORRECTION

PATENT NO. : 5,263,382
DATED : November 23, 1993
INVENTOR(S) : Thurston L. Brooks, Kevin R. Cleary, and Mark Uebel It is certified that error appears in the above-identified patent and that said Letters Patent is hereby corrected as shown below:

In claim 1, column 6, the following change should be incorporated into the text:

Line 6, please delete the comma after the word "base".

In claim 13, column 7, the following change should be incorporated into the text:

Line 5, change the word "lease" to "base".

Signed and Sealed this

Fourth Day of October, 1994

*Attest:*

BRUCE LEHMAN

*Attesting Officer*         *Commissioner of Patents and Trademarks*